(12) United States Patent
Nagai et al.

(10) Patent No.: US 7,109,412 B2
(45) Date of Patent: Sep. 19, 2006

(54) CABLE STRUCTURE

(75) Inventors: Shigekazu Nagai, Adachi-ku (JP); Toru Sugiyama, Abiko (JP); Masahiko Someya, Ryugasaki (JP)

(73) Assignee: SMC Kabushiki Kaisha, Tokyo (JP)

( * ) Notice: Subject to any disclaimer, the term of this patent is extended or adjusted under 35 U.S.C. 154(b) by 619 days.

(21) Appl. No.: 10/368,587

(22) Filed: Feb. 20, 2003

(65) Prior Publication Data
US 2003/0168244 A1  Sep. 11, 2003

(30) Foreign Application Priority Data
Mar. 8, 2002  (JP) .............................. 2002-063095

(51) Int. Cl.
H01B 7/34 (2006.01)
(52) U.S. Cl. ...................................................... 174/36
(58) Field of Classification Search ................. 174/36, 174/110 R, 113 R, 117 F, 117 FF
See application file for complete search history.

(56) References Cited

U.S. PATENT DOCUMENTS

| | | | |
|---|---|---|---|
| 1,795,612 A | 3/1931 | Lormor | |
| 1,928,423 A | 9/1933 | Hansen | |
| 3,177,845 A | 4/1965 | Hedgepeth | |
| 3,273,408 A | 9/1966 | Nagel et al. | |
| 3,749,229 A | 7/1973 | Napadow | |
| 4,440,354 A | 4/1984 | Kobayashi et al. | |
| 4,540,996 A | 9/1985 | Saito | |
| 4,583,619 A | 4/1986 | Fry | |
| 4,676,144 A | 6/1987 | Smith, III | |
| 4,746,766 A * | 5/1988 | Soulard | 174/36 |
| 4,898,351 A * | 2/1990 | Suzuki | 248/51 |
| 5,016,841 A * | 5/1991 | Schumann et al. | 248/51 |
| 5,063,344 A | 11/1991 | Linke | |
| 5,207,115 A | 5/1993 | Takei | |
| 5,460,059 A | 10/1995 | Kato | |
| 5,669,749 A * | 9/1997 | Danielson et al. | 414/280 |
| 5,747,896 A | 5/1998 | Nagai et al. | |
| 5,764,839 A * | 6/1998 | Igl et al. | 385/114 |
| 6,166,332 A * | 12/2000 | Farrow et al. | 174/135 |
| 6,194,664 B1 * | 2/2001 | Zamora et al. | 174/117 F |
| 6,215,068 B1 * | 4/2001 | Meier | 174/68.1 |
| 6,323,428 B1 * | 11/2001 | Takano | 174/117 F |
| 6,756,707 B1 | 6/2004 | Hochhalter et al. | |
| 2003/0067505 A1 | 4/2003 | Kumagai | |

(Continued)

FOREIGN PATENT DOCUMENTS

DE  26 27 528 A1  12/1977

(Continued)

OTHER PUBLICATIONS

Copending U.S. Appl. No. 10/442,067, filed May 21, 2003 by Shigekazu Nagai et al.

(Continued)

*Primary Examiner*—William H. Mayo, III
(74) *Attorney, Agent, or Firm*—Paul A. Guss

(57) ABSTRACT

A cable, which includes a plurality of tubes disposed continuously in the height direction, has one end which is fixed to a first cable-connecting section disposed at one end of a body of an electric actuator. The cable has the other end which is connected to a second cable-connecting section connected to a slider which is displaceable along the axis under the driving action of a rotary driving source. The cable is installed substantially horizontally with respect to the body. The dimension in the height direction is large, and the dimension in the thickness direction is small.

12 Claims, 20 Drawing Sheets

U.S. PATENT DOCUMENTS

| | | |
|---|---|---|
| 2003/0168224 A1 | 9/2003 | Freudenthaler et al. |
| 2003/0217610 A1 | 11/2003 | Nagai et al. |
| 2004/0177993 A1 | 9/2004 | Nagai et al. |

FOREIGN PATENT DOCUMENTS

| | | |
|---|---|---|
| EP | 0 918 174 | 5/1999 |
| JP | 2002-176274 | 6/2002 |
| KR | 0096906 | 11/1995 |
| KR | 1999-37034 | 10/1999 |

OTHER PUBLICATIONS

Co-Pending U.S. Appl. No. 10/793,785, filed Mar. 8, 2004.

Copending U.S. Appl. No. 10/378,822, filed Mar. 5, 2003 by Shigekazu Nagai et al.

Schneeberger Linear Technology Automation, "Linear- und Rotationsmodule," Nov. 26, 2001, p. 4.

Europa-Lehrmittel, "Der Werkzeugbau," Verlag Willing & Co., Wuppertal Barmen, 2. Auflage, 1959, pp. 102-107.

* cited by examiner

CABLE STRUCTURE

BACKGROUND OF THE INVENTION

1. Field of the Invention

The present invention relates to a cable structure to be connected between a fixed member such as an actuator body and a displaceable member such as a slider.

2. Description of the Related Art

Conventionally, as shown in FIG. 26, for example, a second actuator 3, which is constructed as a separate body, is connected to a slider 2 of a first actuator 1. The slider 2 is displaceable in a substantially horizontal direction. A plurality of cables 4 including a lead wire for an electric signal and a tube for a pressure fluid have first ends which are connected to an upper portion of a second actuator body 3a of the second actuator 3. Second ends of the cables 4 are connected to an upper portion of a first actuator body 1a.

The plurality of cables 4 are arranged in a cable guide mechanism 5 of a resin material. The cables 4 are flexed together with the cable guide mechanism 5 when the cable guide mechanism 5 is flexed.

In the cable guide mechanism 5, a plurality of brackets 6, which are made of a resin material, are connected rotatably and continuously to one another by pins 7. The cable guide mechanism 5 is connected to the upper portion of the first actuator body 1a and the upper portion of the second actuator body 3a. The cable guide mechanism 5 is provided to extend flexibly in only the axial direction of the first actuator body 1a.

The cable guide mechanism 5 includes certain clearances, for example, at joined portions between the adjoining brackets 6 and between the pins 7 and the brackets 6 so that the cable guide mechanism 5 is capable of being smoothly flexed while the plurality of cables 4 are arranged.

However, for example, when the conventional cables 4 are applied to an actuator which is arranged substantially horizontally, or when the space in a substantially vertical direction (height direction) of an actuator is restricted, then the brackets 6, the pins 7, and other components are undesirably displaced under the gravity from their original attachment positions due to the clearances provided for the cable guide mechanism 5, if the cables 4 are connected by the cable guide mechanism 5. That is, the cable guide mechanism 5 is bent downwardly approximately about the center of a substantially central portion between the fixed member and the displaceable member of the actuator.

Therefore, when the cables 4 are used for the actuator which is arranged substantially horizontally, it is necessary to provide some additional space in the height direction considering the bending amounts of the cables 4 arranged in the cable guide mechanism 5.

As a result, when the installation space for the actuator is restricted in the height direction, the cable guide mechanism 5 may be abraded by the contact, for example, with the floor surface or another apparatus provided under the actuator. Therefore, the durability of the cables 4 is deteriorated due to the abrasion, and the resistance arises because of the contact of the cables 4 when the actuator is axially displaced.

SUMMARY OF THE INVENTION

A general object of the present invention is to provide a cable structure which makes it possible to retain a belt member substantially horizontally with respect to an actuator body when the installation space for an actuator is restricted in the height direction.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
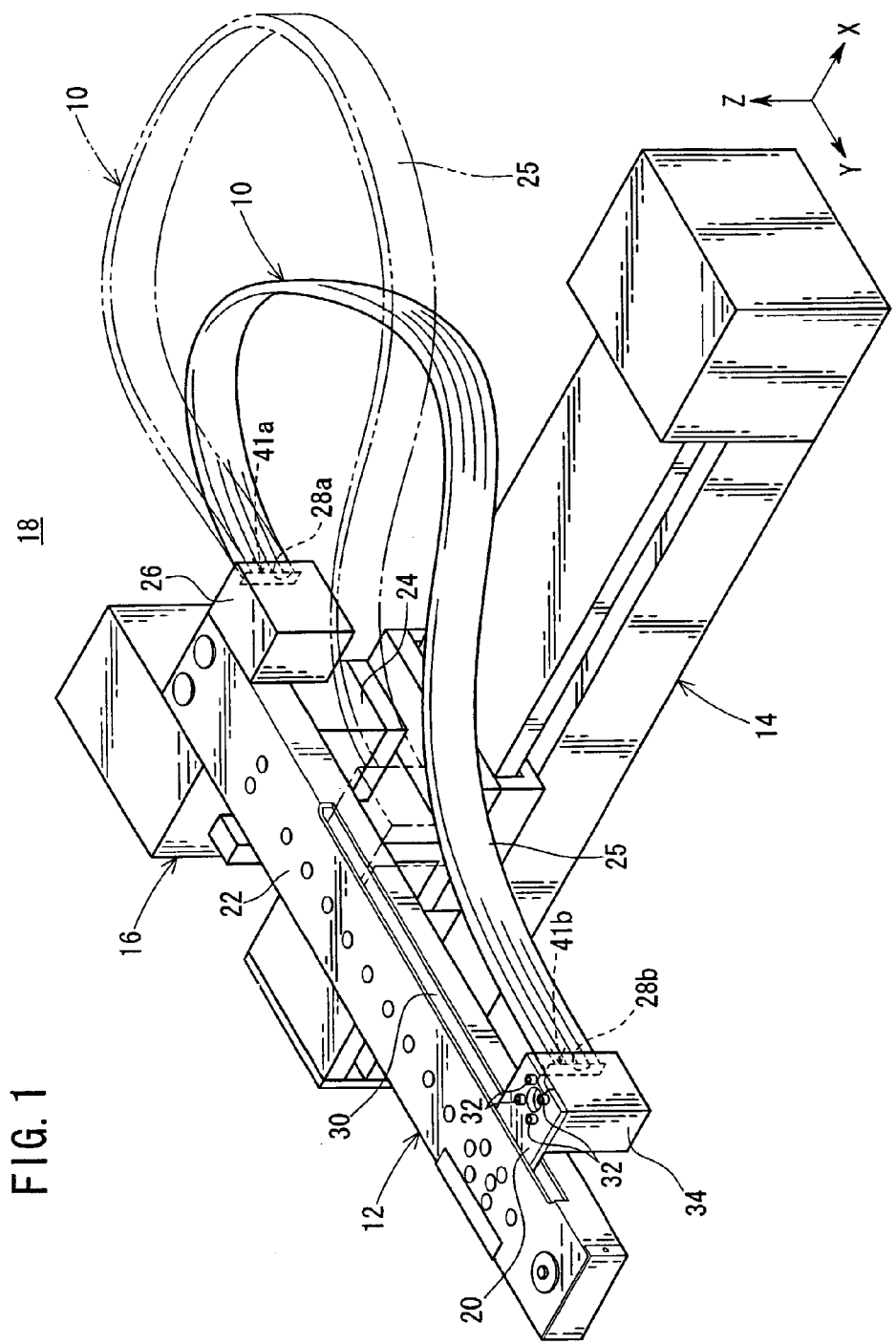
FIG. 1 is a perspective view illustrating an electric actuator to which a cable according to a first embodiment of the present invention is applied.

FIG. 1 is a perspective view illustrating an electric actuator 12 to which a cable 10 according to a first embodiment of the present invention is applied. The electric actuator 12 is assembled to a three-axis displacement apparatus 18 comprising three electric actuators 12, 14, 16 in combination, and the electric actuator 12 has a slider (displaceable member) 20 which is displaceable along the Y axis.

That is, the electric actuator 12 is displaceable in the direction of the arrow X when the electric actuator 14 is displaced. The electric actuator 14 is provided with a slider which is displaceable along the X axis. The electric actuator 12 is displaceable in the direction of the arrow Z by the electric actuator 16. The electric actuator 16 is provided with a slider which is displaceable in the Z axis.

The electric actuator 12 comprises an elongate body (actuator body) 22, a rotary driving source 24 which is connected to a lower portion of one end of the body 22, an unillustrated first pulley member which is connected to a drive shaft of the rotary driving source 24, an unillustrated second pulley member which is rotatably supported on the other end of the body 22, an unillustrated timing belt which runs over the pair of first and second pulley members respectively, the slider 20 which is displaceable in the axial direction when the timing belt is rotated, and a band-shaped belt member 25 which has one end connected to one end of the fixed body 22 and which has the other end connected to the movable slider 20. The slider 20 is connected to the timing belt.

A first cable-connecting section (fixed end) 26, which protrudes by a predetermined length, is provided at one end of the body 22. An insertion hole 28a, into which one end of the belt member 25 is inserted, is formed in the first cable-connecting section 26.

The rotary driving source 24 is connected to a lower portion at one end of the body 22 by unillustrated screw members. The rotary driving source 24 is driven by an unillustrated power source, and its rotary driving force is transmitted to the first pulley member which is arranged in the body 22.

The slider 20 is provided such that a part of the slider 20 protrudes outwardly from an opening 30 which is formed in the side surface of the body 22. A second cable-connecting section (movable end) 34 is connected by screw members 32 to the lower surface of the slider 20 protruding outside. An insertion hole 28b, into which the other end of the belt member 25 is inserted, is formed on the side surface of the second cable-connecting section 34 disposed on the side of the body 22.

The belt member 25 is made of a resin material so that the belt member 25 is flexible. In the belt member 25, the vertical dimension A (height or width) is large and the horizontal dimension B (thickness) is small (see FIG. 6). In other words, the dimension A in the height direction is larger than the dimension B in the thickness direction (A>B).

That is, the belt member 25 is thin plate-shaped, in which the belt member 25 is wide in the height direction. Accordingly, it is possible to increase the rigidity of the cable 10 in the height direction. Therefore, it is possible to suppress the bending of the cable 10 in the direction of the gravity caused by the own weight of the cable 10. Further, when the belt member 25 is thin plate-shaped, it is possible to improve the flexibility of the belt member 25 more appropriately.

Figure 5:
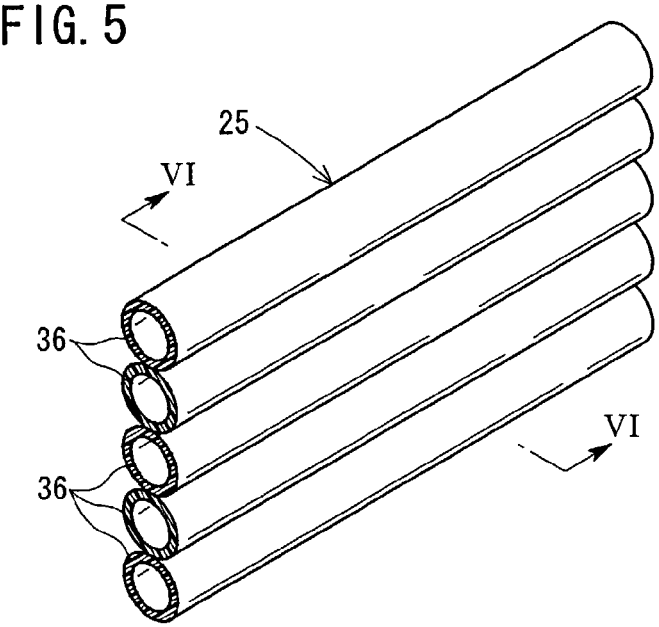
FIG. 5 is, with partial cross section, a perspective view illustrating a belt member of the cable shown in FIG. 1.
Figure 6:
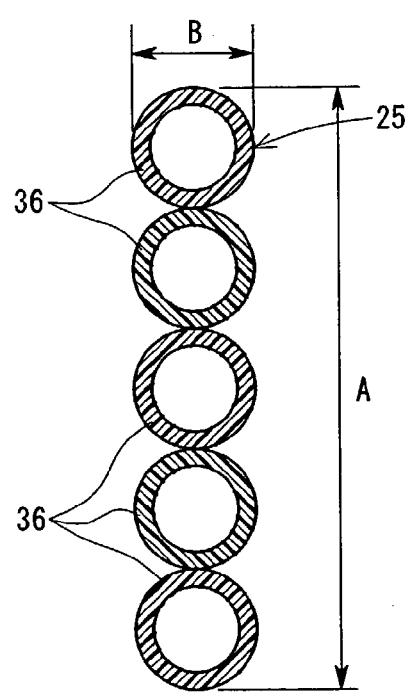
FIG. 6 is a vertical sectional view taken along a line VI—VI shown in FIG. 5.

As shown in FIGS. 5 and 6, the belt member 25 includes tubes 36 into each of which an unillustrated lead wire for an electric signal is inserted or through each of which a pressure fluid such as air is supplied. The tubes 36 are arranged continuously in a band-shaped form in which the tubes 36 are disposed in parallel in the height direction respectively. The plurality of tubes 36 can be arranged continuously in parallel as follows. The outer circumferential surfaces of the tubes 36, on which the tubes 36 abut each other, may be bonded or welded to one another. Alternatively, the entire belt member 25, in which the plurality of tubes 36 are juxtaposed, may be integrally formed.

That is, when the tubes 36 are joined in parallel in the height direction, the dimension A (see FIG. 6) of the belt member 25 in the height direction can be large. Therefore, it is possible to secure the large rigidity of the belt member 25 in the height direction, and it is possible to suppress the bending of the cable 10 in the direction of the gravity.

As shown in FIG. 1, one end of the belt member 25 is inserted by a predetermined length into the insertion hole 28a which is formed substantially in parallel to the side surface of the body 22 in the first cable-connecting section 26 of the body 22. The one end of the belt member 25 is connected by an unillustrated fixing mechanism.

The other end of the belt member 25 is inserted by a predetermined length into the insertion hole 28b which is formed substantially in parallel to the side surface of the body 22 on the side surface of the second cable-connecting section 34 which is connected to the lower portion of the slider 20. The other end of the belt member 25 is connected by an unillustrated fixing mechanism. That is, the belt member 25 is connected substantially in parallel in the axial direction of the body 22 in a curved form between the first cable-connecting section 26 and the second cable-connecting section 34. In other words, the side surface of the belt member 25 along the height direction is substantially parallel with a certain vertical plane.

The length of the belt member 25 is set such that the belt member 25 fixed to the first cable-connecting section 26 on one end of the body 22 has some amount of margin when the slider 20 is maximally displaced up to the other end of the body 22 disposed on the side opposite to the rotary driving source 24.

That is, if the length of the belt member 25 has some amount of margin when the slider 20 is displaced to the other end of the body 22 disposed farthest from the first cable-connecting section 26, the resistance against the displacement of the slider 20 is avoided.

Figure 4:
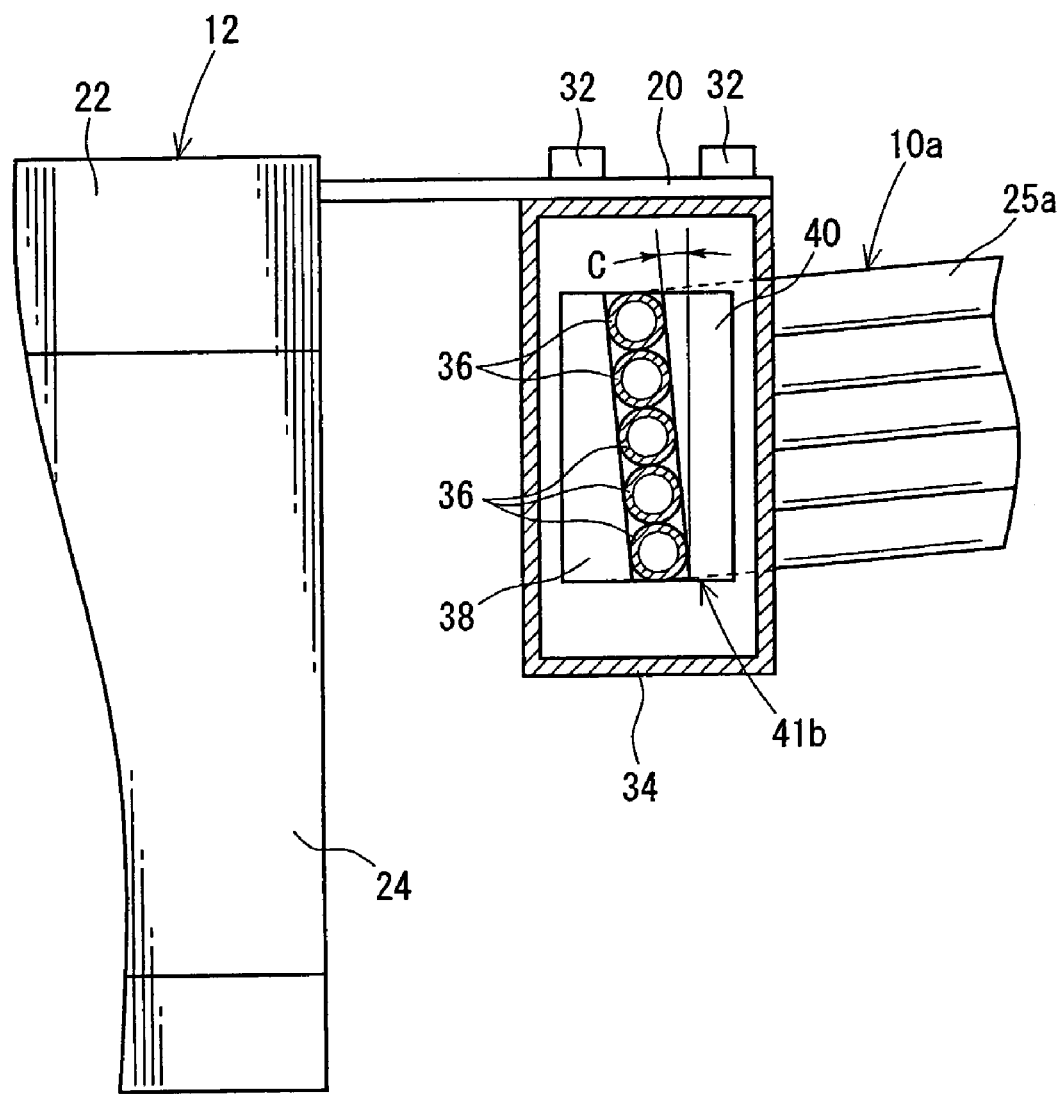
FIG. 4 is, with partial omission, a vertical sectional view illustrating a second cable-connecting section shown in FIG. 3.

As shown in FIG. 4, when the belt member 25 is connected to the first cable-connecting section 26 and the second cable-connecting section 34, both ends of the belt member 25 are interposed and supported between first and second attachment members 38, 40 provided in the first cable-connecting section 26 and the second cable-connecting section 34. In this arrangement, the inner wall surface of each of the first and second attachment members 38, 40 facing the belt member 25a is formed such that the upper portion of the belt member 25a is inclined by a predetermined angle C toward the side of the body 22 of the electric actuator 12 with respect to the vertical plane.

The angles of inclination of the inner wall surfaces of the first and second attachment members 38, 40 are formed to be substantially identical angles so that the inner wall surfaces are substantially parallel to one another. Both ends of the cable 10a are interposed between the first and second attachment members 38, 40 by unillustrated screw members.

Figure 2:
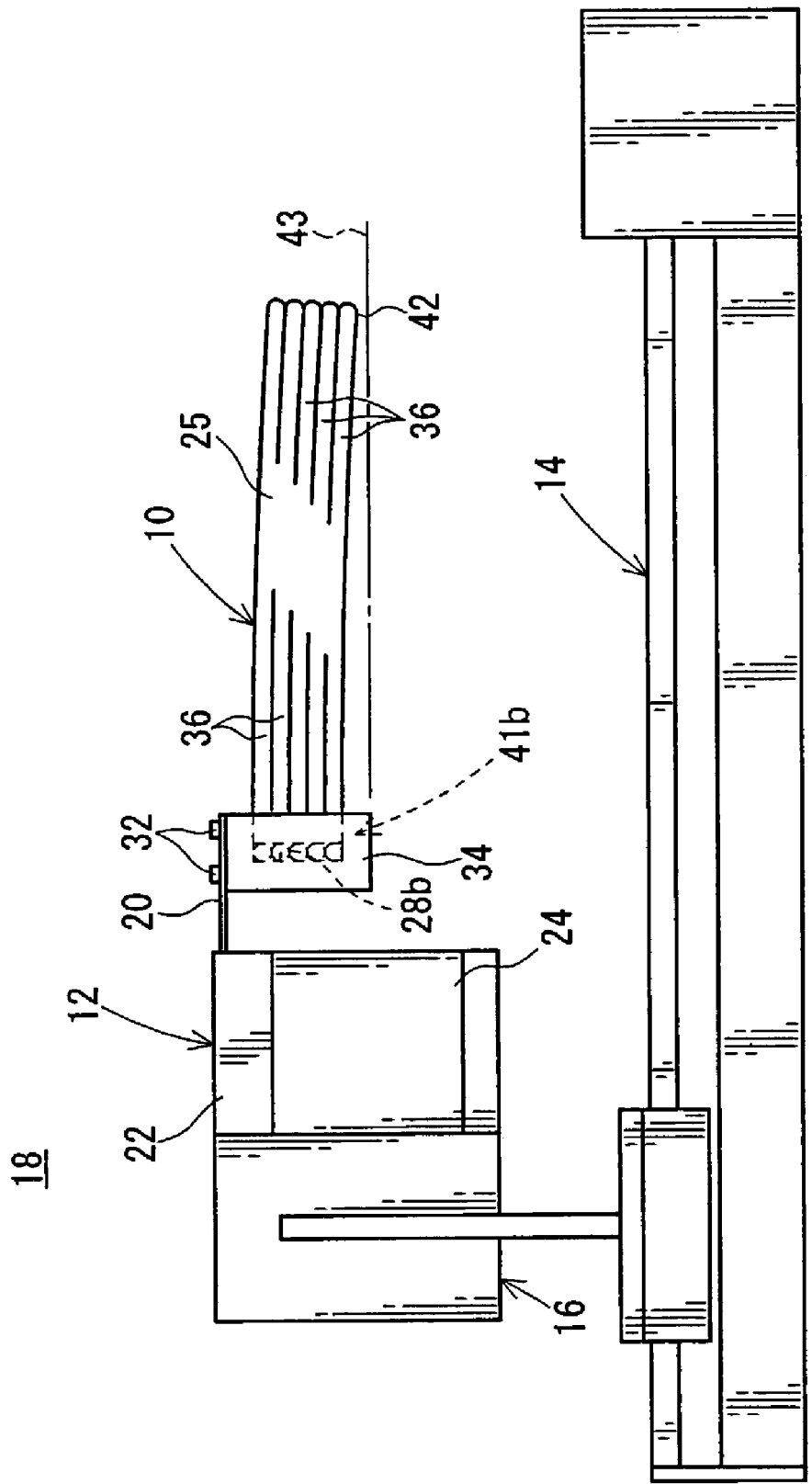
FIG. 2 is, with partial omission, a side view illustrating the electric actuator shown in FIG. 1.
Figure 3:
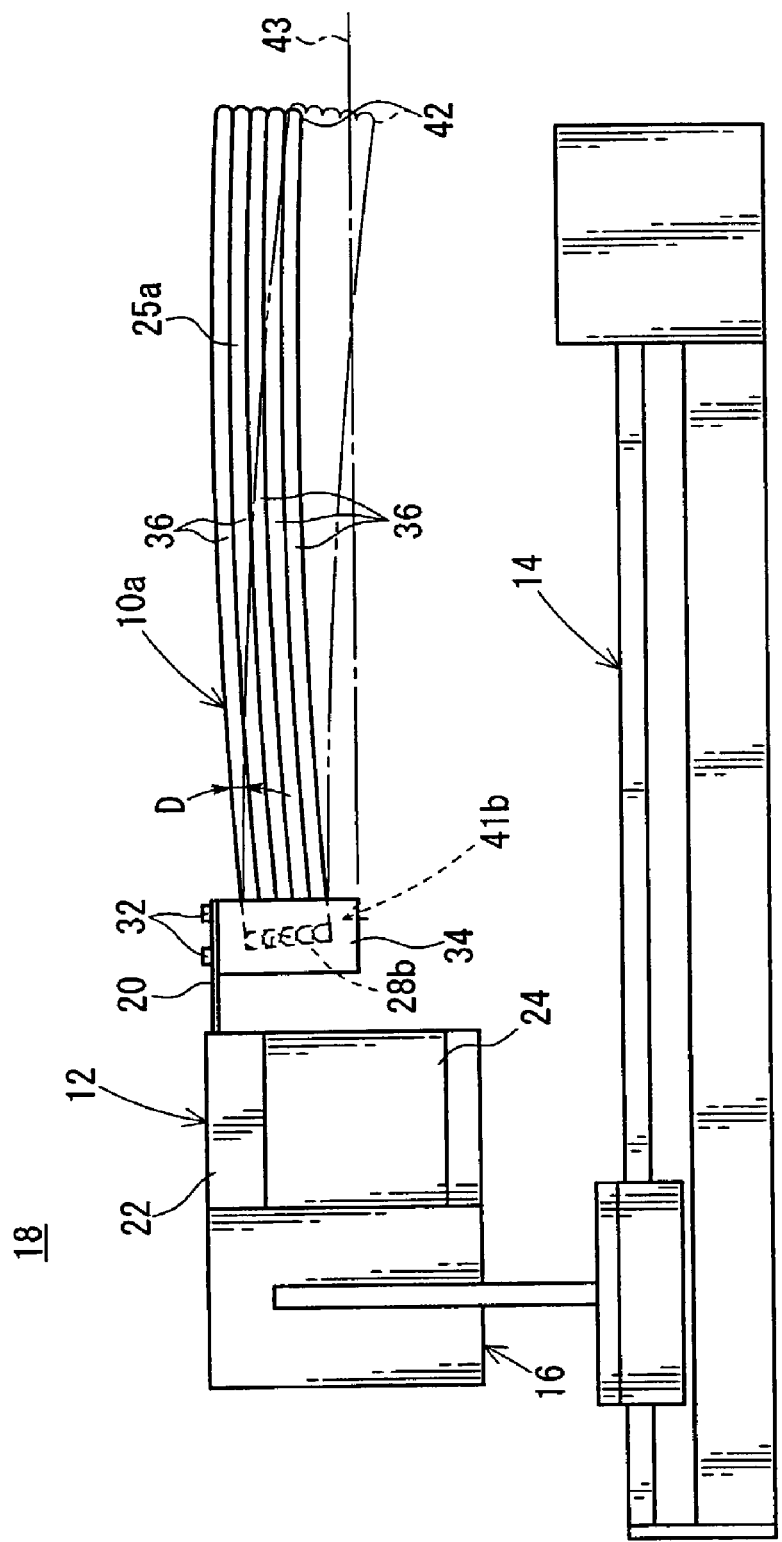
FIG. 3 is, with partial omission, a side view illustrating an angle D of attachment of the cable shown in FIG. 1.

As a result, as shown in FIG. 3, the bending moment acts on the cable 10a in a direction in which the belt member 25a is inclined toward the body 22 about the support points of the attachment section 41a of the first cable-connecting section 26 (see FIG. 1) and the attachment section 41b of the second cable-connecting section 34. Accordingly, it is possible to suppress the bending of the belt member 25a in the direction of the gravity generated substantially in the vicinity of the center of the belt member 25a, as compared with the belt member 25 connected to the insertion holes 28a, 28b (see FIG. 2) which is attached in substantially parallel with the height direction of the body 22.

That is, when the belt member 25a, which is longer than the belt member 25 (see FIG. 2) by a predetermined length, is attached to the body 22 and the slider 20 so that the belt member 25a is substantially horizontal, the rigidity is insufficient in the height direction of the belt member 25a because the belt member 25a is long. Thus, the bending amount of the cable 10a is increased in the direction of the gravity. As a result, the lower end 42 of the bending of the cable 10a in the direction of the gravity may extend downwardly beyond a lower level 43 of the first and second cable-connecting sections 26, 34 of the electric actuator 12 (see FIG. 3).

In this situation, when the belt member 25a is inclined upwardly by a predetermined angle D about the support points of the attachment sections 41a, 41b of the first cable-connecting section 26 and the second cable-connecting section 34, then the lower end 42 of the bending of the cable 10a in the direction of the gravity generated substantially in the vicinity of the center of the cable 10a can be shifted upwardly, and it is possible to avoid any displacement over the lower level 43 of the first and second cable-connecting sections 26, 34 of the electric actuator 12.

As shown in FIG. 4, the angles of inclination of the inner wall surfaces of the first and second attachment members 38, 40 for interposing the belt member 25a therebetween are changed while the inner wall surfaces of the first and second attachment members 38, 40 are maintained substantially in parallel with one another. The angles of attachment of the cable 10a connected to the first cable-connecting section 26 (see FIG. 1) and the second cable-connecting section 34 can be adjusted to be arbitrary angles of inclination. As a result, it is possible to conveniently adjust the position of the lower end 42 of the bending of the cable 10a (see FIG. 3) in the height direction.

The electric actuator 12, to which the cable 10 according to the first embodiment of the present invention is applied, is basically constructed as described above. Next, its operation, function, and effect will be explained.

The rotary driving source 24 is energized by using the unillustrated power source. When the rotary driving source 24 is rotated, the unillustrated first pulley member, which is provided on one end of the body 22, is rotated by the drive shaft.

The unillustrated second pulley member, which is disposed on the other end of the body 22 and which is connected by the timing belt, is rotated by the rotation of the first pulley member. As a result, the slider 20 connected to the unillustrated timing belt is displaced in the axial direction of the body 22.

In this arrangement, the other end of the belt member 25 is installed to the slider 20 by the aid of the second cable-connecting section 34. Therefore, the other end of the belt member 25 is displaced while following the slider 20. As a result, the belt member 25 of the resin material is flexed substantially along the horizontal plane between the body 22 to which one end of the belt member 25 is installed and the slider 20 to which the other end is installed. That is, the belt member 25 is flexible substantially on the horizontal plane when the slider 20 and the second cable-connecting section 34 are displaced in an integrated manner.

The belt member 25 is wide in the height direction and is thin in the thickness direction. Therefore, the bending of the belt member 25 is suppressed in the direction of the gravity. As a result, the lower end 42 of the bending of the belt member 25 in the direction of the gravity does not extend downwardly beyond the lower level of the first and second cable-connecting sections 26, 34 of the electric actuator 12 (see FIG. 2).

As described above, in the first embodiment, the belt member 25, which is provided between the body 22 and the slider 20, is wide in the height direction, and the belt member 25 is thin in the thickness direction. Accordingly, the rigidity of the cable 10 itself is increased in the height direction, and it is possible to suppress the bending of the cable 10 in the direction of the gravity. As a result, it is possible to provide the cable 10 flexibly substantially in the horizontal direction. Therefore, the cable 10 can be preferably used even if there is any restriction of the space in the height direction of the cable 10 of the electric actuator 12.

The cable 10 is not bent to extend downwardly beyond the lower level of the first and second cable-connecting sections 26, 34 of the electric actuator 12. Therefore, the cable 10 does not contact, for example, the floor surface or another apparatus installed under the electric actuator 12. It is possible to avoid the resistance when the cable 10 is displaced.

As to durability, the deterioration of the cable 10 is prevented because the cable 10 does not contact the floor surface or another apparatus (for example, the electric actuator 14) installed under the electric actuator 12.

It is possible to suppress the bending amount of the cable 10 in the direction of the gravity. Therefore, it is possible to reduce the installation space in the height direction of the apparatus such as the electric actuator 12 to which the cable 10 is applied, and it is possible to save the space.

Figure 7:
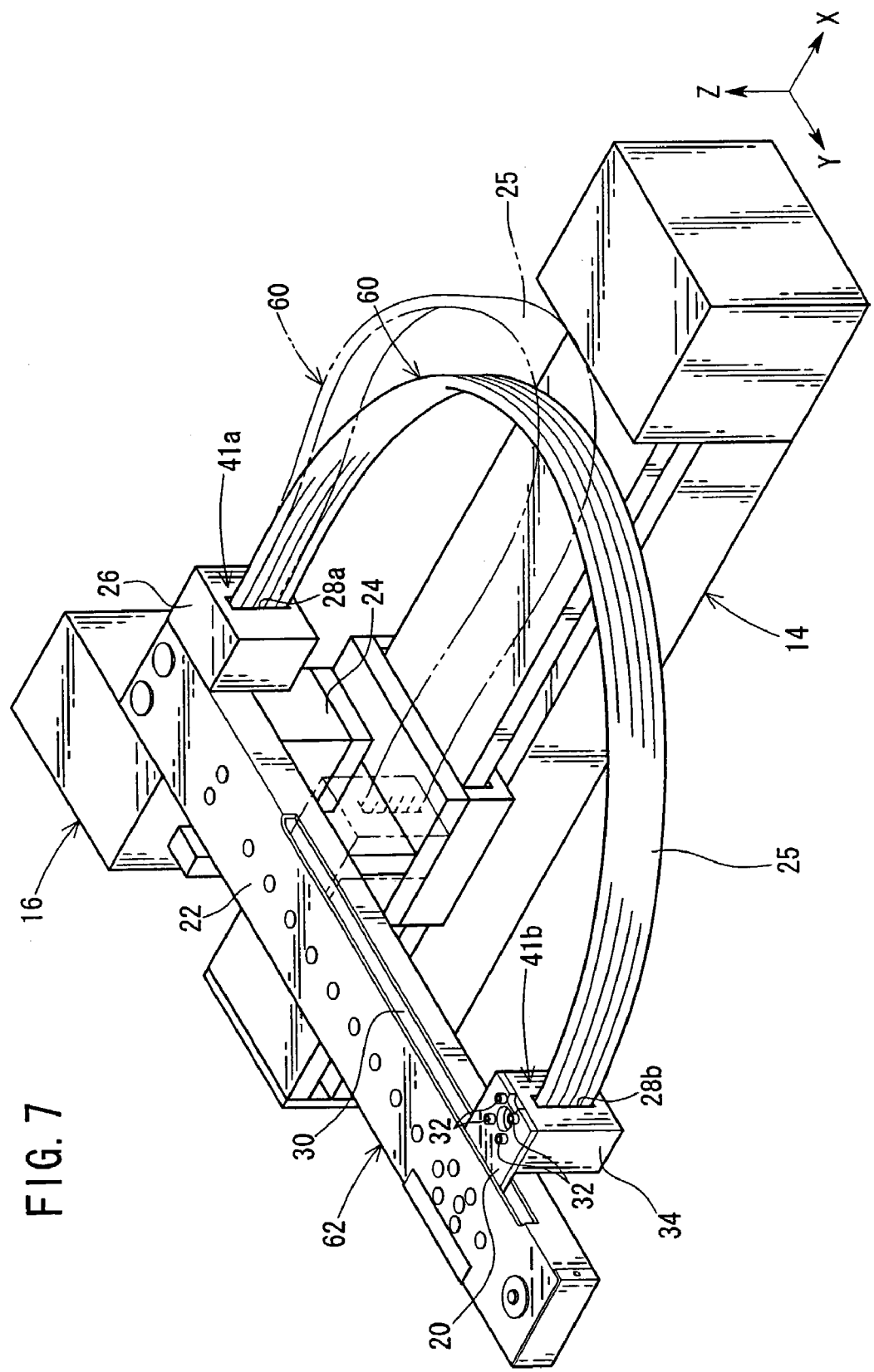
FIG. 7 is a perspective view illustrating an electric actuator to which a cable according to a second embodiment of the present invention is applied.

Next, an electric actuator 62, to which a cable 60 according to a second embodiment is applied, is shown in FIG. 7. In the following embodiments, the constituent elements that are same as those of the cable 10 according to the first embodiment described above are designated by the same reference numerals, and detailed explanation thereof will be omitted.

Figure 8:
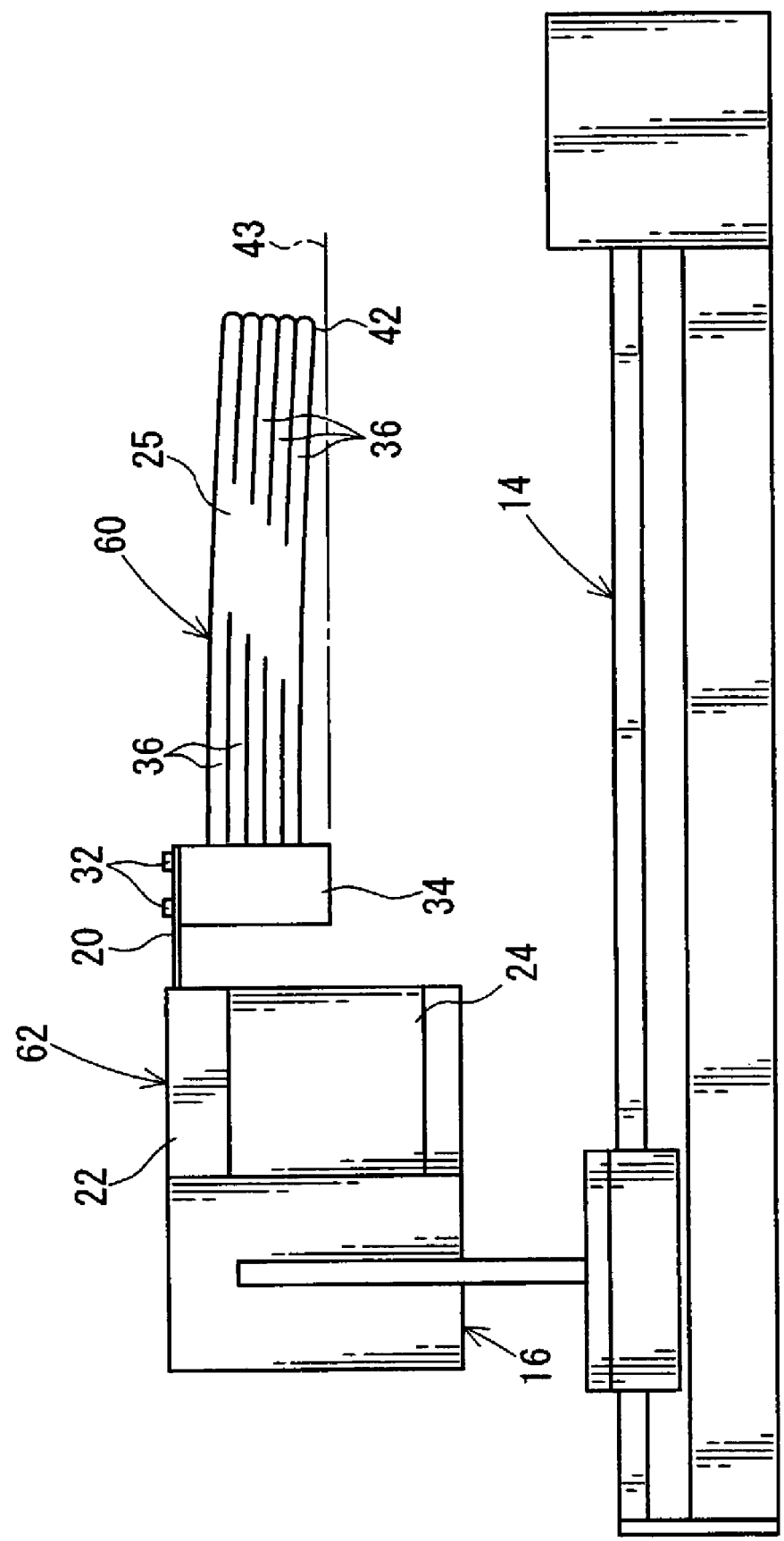
FIG. 8 is, with partial omission, a side view illustrating the electric actuator shown in FIG. 7.

The cable 60 according to the second embodiment is different from the cable 10 according to the first embodiment in that one end and the other end of the belt member 25 are attached to the body 22 and the slider 20 in directions substantially perpendicular to the axis of the body 22 respectively (see FIG. 8).

When both ends of the belt member 25 are attached in the directions substantially perpendicular to the axis of the body 22 as described above, the intermediate portion of the belt member 25 disposed between the body 22 and the slider 20 is retained in the space between the insertion hole 28a of the first cable-connecting section 26 and the insertion hole 28b of the second cable-connecting section 34. Therefore, it is possible to suppress the amount of the belt member 25 extending outwardly beyond both ends in the axial direction of the body 22 as compared with the cable 10 shown in FIG. 1.

Figure 9:
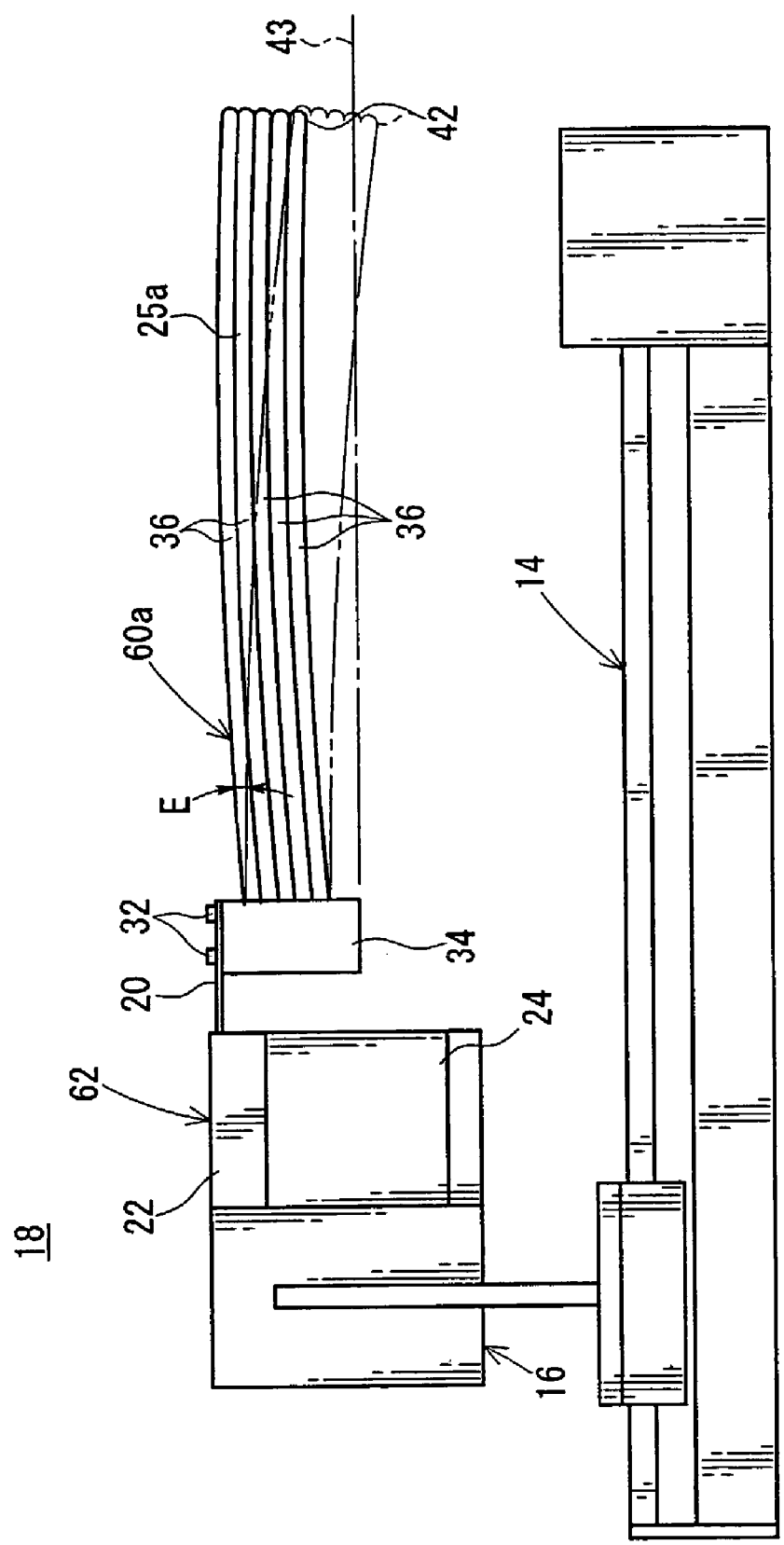
FIG. 9 is, with partial omission, a side view illustrating an angle E of attachment of the cable shown in FIG. 7.

As shown in FIG. 9, the cable 60a is attached obliquely upwardly by a predetermined angle E with respect to the attachment sections 41a, 41b of the first cable-connecting section 26 and the second cable-connecting section 34. Therefore, the bending moment acts in a direction in which the belt member 25 is inclined toward the body 22 about the support points of the attachment sections 41a, 41b of the body 22 and the slider 20 for attaching the belt member 25 respectively. As a result, it is possible to suppress the bending of the belt member 25 in the direction of the gravity generated substantially in the vicinity of the center of the belt member 25, as compared with the belt member 25 which is attached substantially horizontally to the attachment sections 41a, 41b (see FIG. 8).

That is, when the belt member 25a, which is longer than the belt member 25 by a predetermined length, is attached to the body 22 and the slider 20 so that the belt member 25a is substantially horizontal, the rigidity is insufficient in the height direction of the belt member 25a due to the length of the belt member 25a. For this reason, the bending amount of the cable 60a is increased in the direction of the gravity. The lower end 42 of the bending of the cable 60a in the direction of the gravity may extend downwardly beyond the lower level 43 of the first cable-connecting section 26 and the second cable-connecting section 34 of the electric actuator 62.

In this situation, the cable 60a is inclined upwardly by a predetermined angle E with respect to the attachment sections 41a, 41b of the first cable-connecting section 26 and the second cable-connecting section 34.

As a result, the lower end 42 of the bending of the cable 60a generated substantially in the vicinity of the center of the cable 60a can be shifted upwardly, and it is possible to avoid any displacement over the lower level 43 of the first cable-connecting section 26 and the second cable-connecting section 34 of the electric actuator 62.

Figure 10:
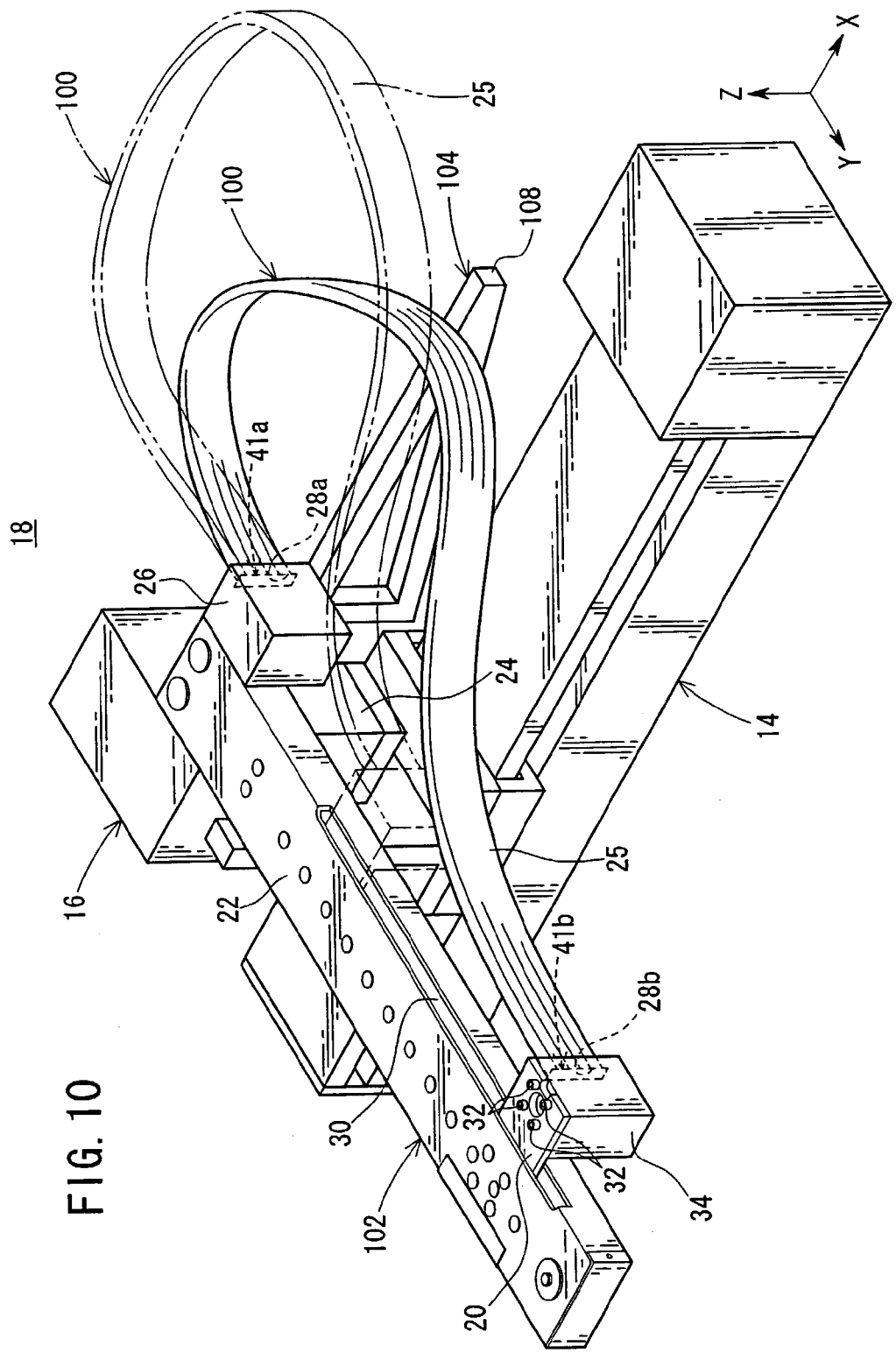
FIG. 10 is a perspective view illustrating an electric actuator to which a cable according to a third embodiment of the present invention is applied.

Next, an electric actuator 102, to which a cable 100 according to a third embodiment is applied, is shown in FIG. 10.

The cable 100 according to the third embodiment is different from the cable 10 according to the first embodiment in that a guide mechanism 104 is provided for supporting the lower surface of the belt member 25 when the belt member 25 is flexed in accordance with the displacement of the slider 20.

Figure 11:
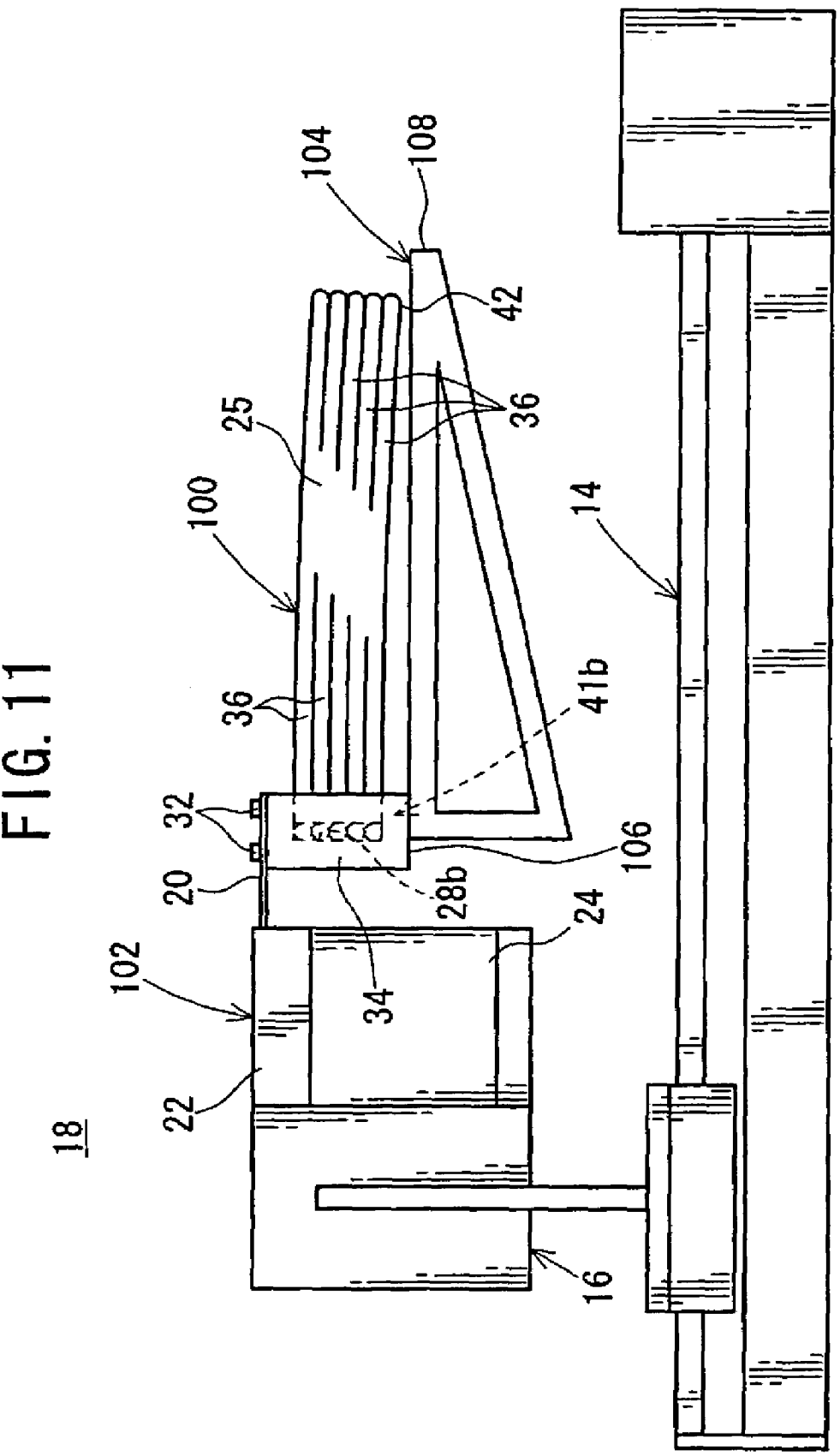
FIG. 11 is, with partial omission, a side view illustrating the electric actuator shown in FIG. 10.

As shown in FIG. 11, the guide mechanism 104, which suppresses the bending of the belt member 25 in the direction of the gravity, is provided at a position to support the lower surface of the belt member 25. The guide mechanism 104 comprises a substantially triangular guide bar (guide member) 108. In the guide mechanism 104, the upper surface of the guide bar 108 is substantially flush with the lower surface of the first cable-connecting section 26.

As a result, when the belt member 25 is flexed and displaced about the support point of one end installed to the body 22 under the displacement action of the slider 20, the lower surface of the belt member 25 is appropriately retained by the upper surface of the guide bar 108. Accordingly, the belt member 25 is prevented from being bent downwardly from the upper surface of the guide bar 108.

That is, the belt member 25 is retained by the upper surface of the guide bar 108. Accordingly, the lower end 42 of the bending of the belt member 25 in the direction of the gravity is prevented from displacement over the lower level of the first cable-connecting section 26 and the second cable-connecting section 34 of the electric actuator 102.

Figure 12:
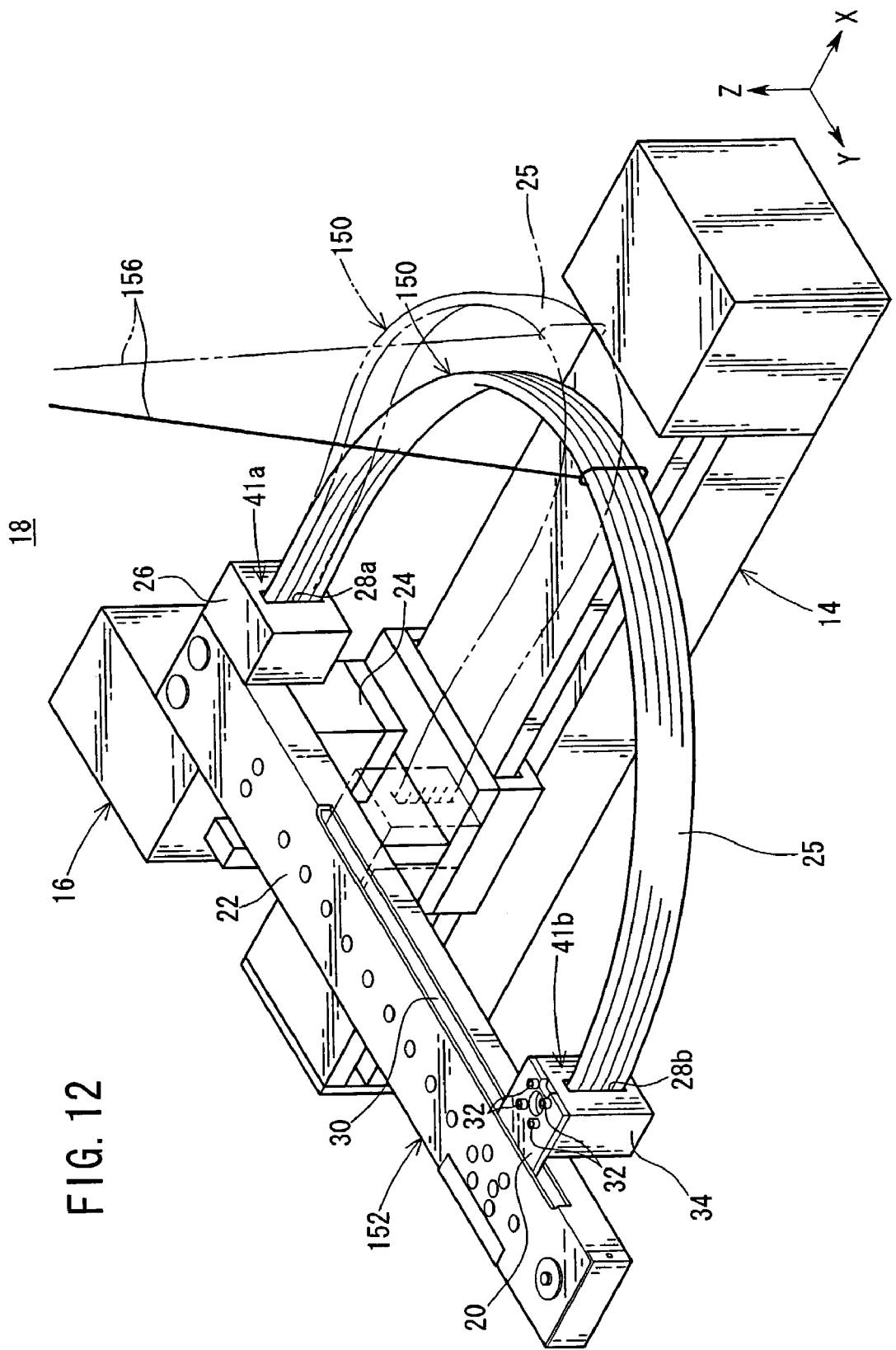
FIG. 12 is a perspective view illustrating an electric actuator to which a cable according to a fourth embodiment of the present invention is applied.

Next, an electric actuator 152, to which a cable 150 according to a fourth embodiment is applied, is shown in FIG. 12.

Figure 13:
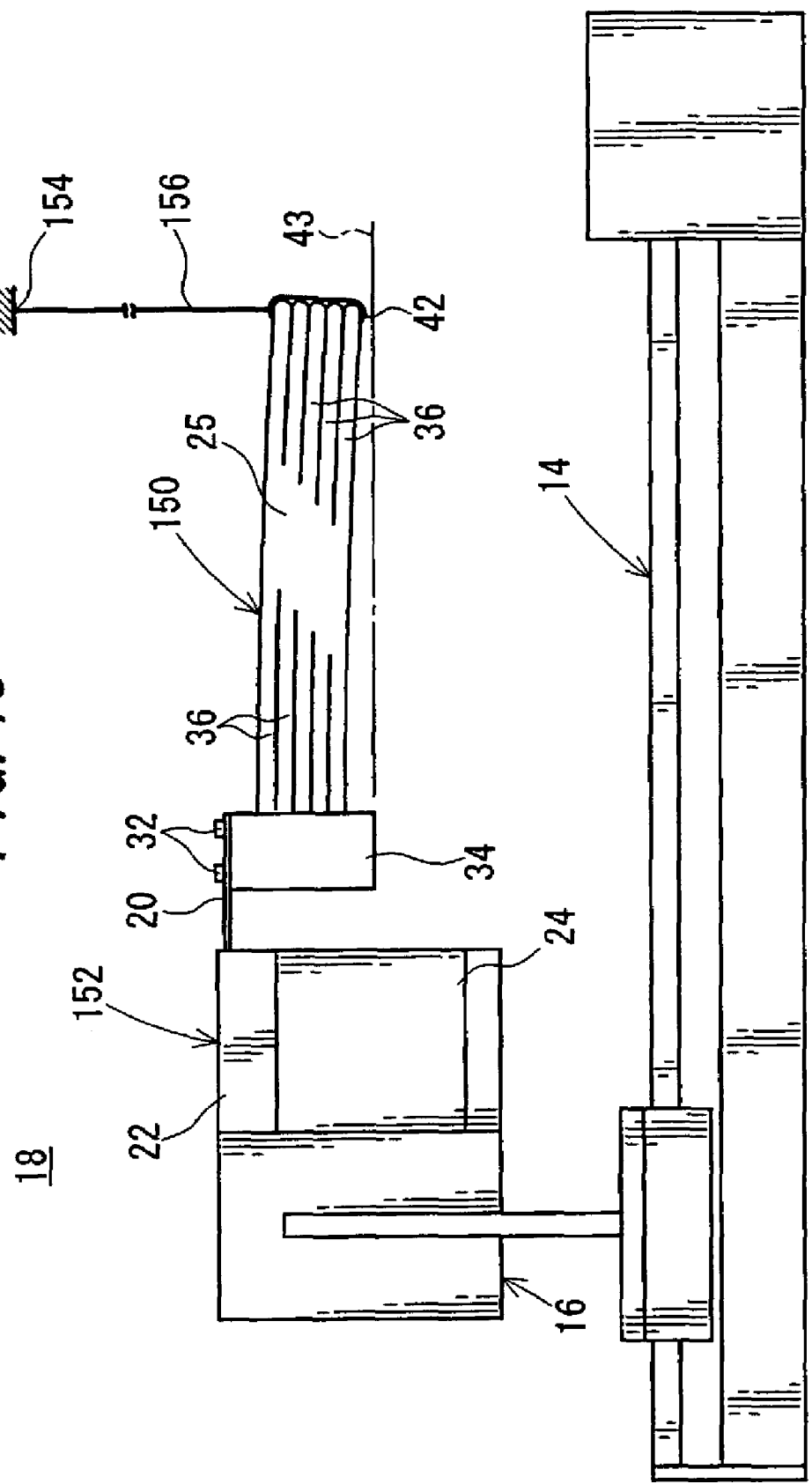
FIG. 13 is, with partial omission, a side view illustrating the electric actuator shown in FIG. 12.

The cable 150 according to the fourth embodiment is different from the cable 10 according to the first embodiment in that the downward bending of the cable 150 is suppressed by hanging a substantially central portion of the belt member 25 by means of a hanging member 156 such as a wire which is connected, for example, to the ceiling 154 (see FIG. 13).

As shown in FIG. 13, the substantially central portion of the belt member 25 is hung by means of the hanging member 156 having one end which is connected to the ceiling 154 or the position higher than the cable 150. The cable 150 is hung by the hanging member 156 so that the cable 150 is substantially horizontal with respect to the attachment sections 41a, 41b of the first cable-connecting section 26 and the second cable-connecting section 34. The length of the hanging member 156 is set to be somewhat long with a margin so that no resistance arises against the displacement when the cable 150 is flexed with the displacement the slider 20.

As a result, the substantially central portion of the belt member 25 is always hung by the hanging member 156 so that the belt member 25 is substantially horizontal with respect to the body 22. Accordingly, the cable 150 is prevented from any downward bending, and the cable 150 is prevented from any downward displacement over the lower level 43 of the first cable-connecting section 26 and the second cable-connecting section 34 of the electric actuator 152. The bending amount of the cable 150 can be arbitrarily adjusted by arbitrarily setting the length and the number of the hanging member or hanging members 156 and the position of the ceiling 154 or the like for hanging one end of the hanging member 156.

Next, an explanation will be made about cross-sectional structures of belt members 25b to 25g according to first to sixth modified embodiments.

Figure 14:
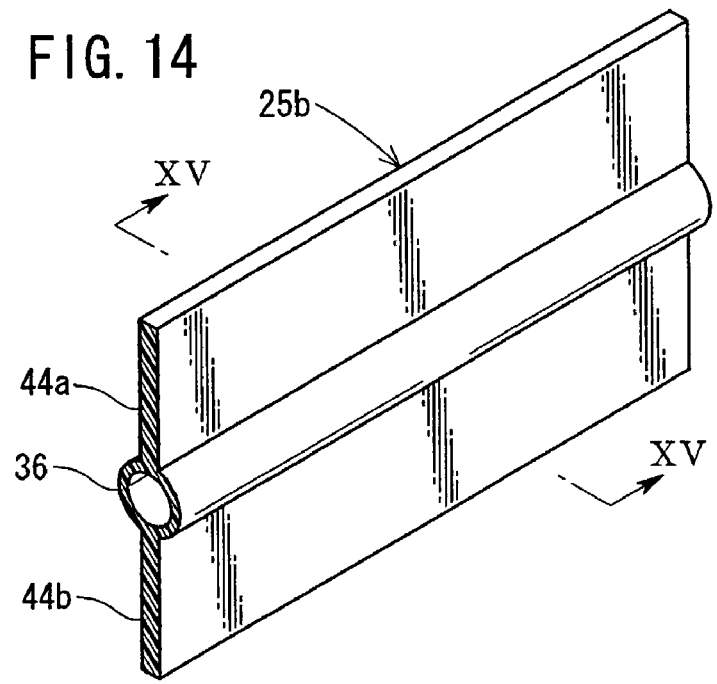
FIG. 14 is, with partial cross section, a perspective view illustrating a belt member according to a first modified embodiment.
Figure 15:
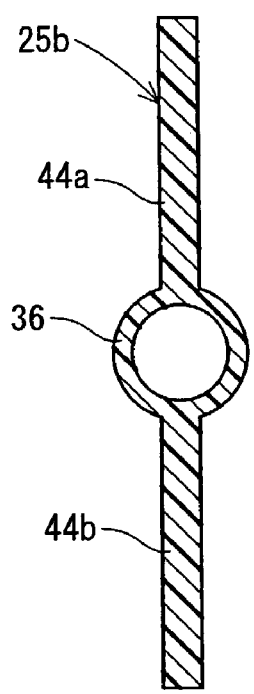
FIG. 15 is a vertical sectional view taken along a line XV—XV shown in FIG. 14.

As shown in FIGS. 14 and 15, when the number of the tube 36 of the belt member 25b according to the first modified embodiment is one, then the tube 36 is arranged at a substantially central portion of the belt member 25b in the height direction, and the tube 36 and wall surfaces 44a, 44b extending in the vertical direction respectively are formed integrally.

When the structure as described above is adopted, the belt member 25b can be wide in the height direction by means of the wall surfaces 44a, 44b which extend in the height direction of the belt member 25b even if the number of the tube or tubes 36 is small. Accordingly, it is possible to secure the large rigidity of the belt member 25b in the height direction, and it is possible to suppress the bending in the direction of the gravity generated in the belt member 25b.

Figure 16:
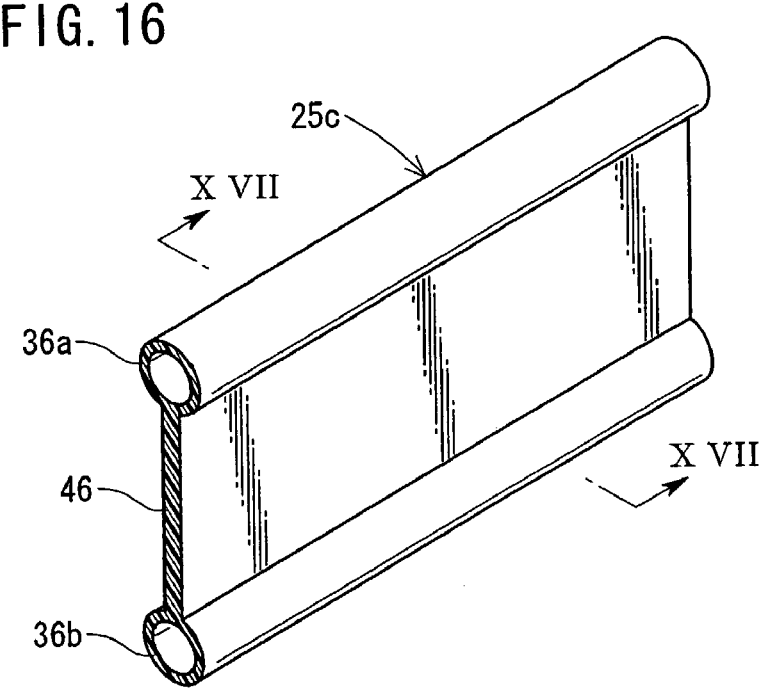
FIG. 16 is, with partial cross section, a perspective view illustrating a belt member according to a second modified embodiment.
Figure 17:
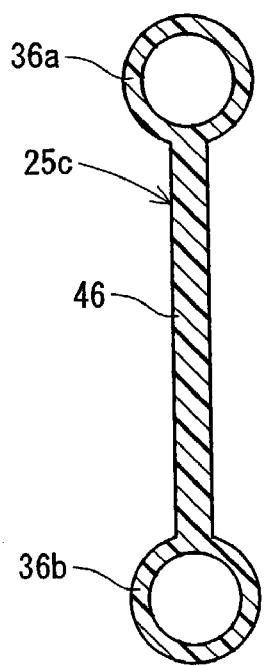
FIG. 17 is a vertical sectional view taken along a line XVII—XVII shown in FIG. 16.

As shown in FIGS. 16 and 17, when the belt member 25c according to the second modified embodiment is constructed by a pair of tubes 36, the tubes 36a, 36b are provided at the upper end and the lower end of the belt member 25c in the height direction so that the tubes 36a, 36b are spaced from each other by a predetermined distance. The tube 36a provided at the upper end of the belt member 25c and the tube 36b provided at the lower end are integrally connected by a wall section 46 having a predetermined length and a thickness.

When the structure as described above is adopted, the belt member 25c can be wide in height direction by means of the wall section 46 even in the case of the pair of tubes 36a, 36b.

Accordingly, it is possible to secure the large rigidity of the belt member 25c in the height direction, and it is possible to suppress the bending in the direction of the gravity generated in the belt member 25c.

Figure 18:
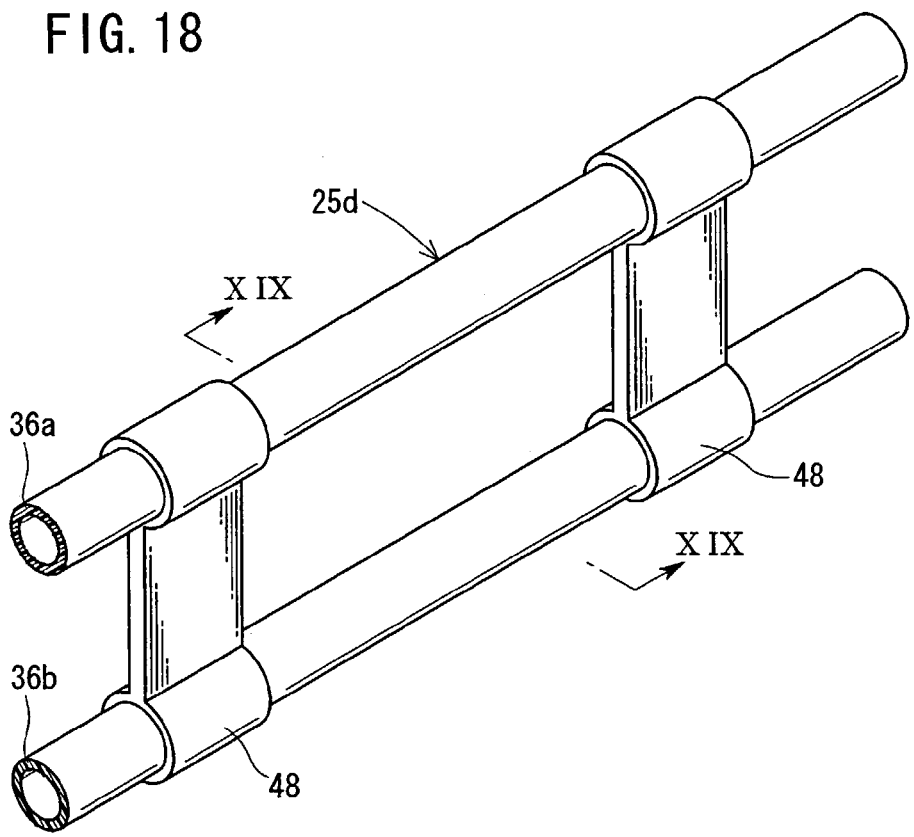
FIG. 18 is, with partial cross section, a perspective view illustrating a belt member according to a third modified embodiment.
Figure 19:
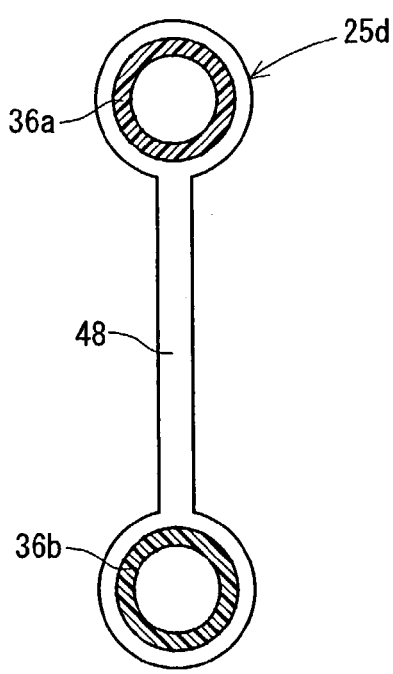
FIG. 19 is a vertical sectional view taken along a line XIX—XIX shown in FIG. 18.

As shown in FIGS. 18 and 19, the two tubes 36a, 36b, which constitute the belt member 25d according to the third modified embodiment, are retained by holding yokes (holding members) 48 while being spaced from each other by a predetermined distance in a direction substantially perpendicular to the longitudinal direction. The holding yoke 48 is made of a material having a strength to a degree that the distance between the tubes 36a, 36b is not changed. The holding yokes 48 are installed while being spaced from each other by predetermined distances in the longitudinal direction of the tubes 36a, 36b. The degree of flexibility of the tubes 36a, 36b can be adjusted by adjusting the distance between the holding yokes 48 and the number of the holding yokes 48.

When the structure as described above is adopted, the belt member 25d can be formed to have the large dimension in the height direction even if the number of the tubes 36a, 36b is small. Accordingly, it is possible to secure the large rigidity in the height direction substantially equivalently to the belt member 25d formed to have the band-shaped form. It is possible to suppress the bending in the direction of the gravity generated in the belt member 25d.

In this structure, the tubes 36a, 36b are exposed. Therefore, it is easy to perform maintenance operation.

Figure 20:
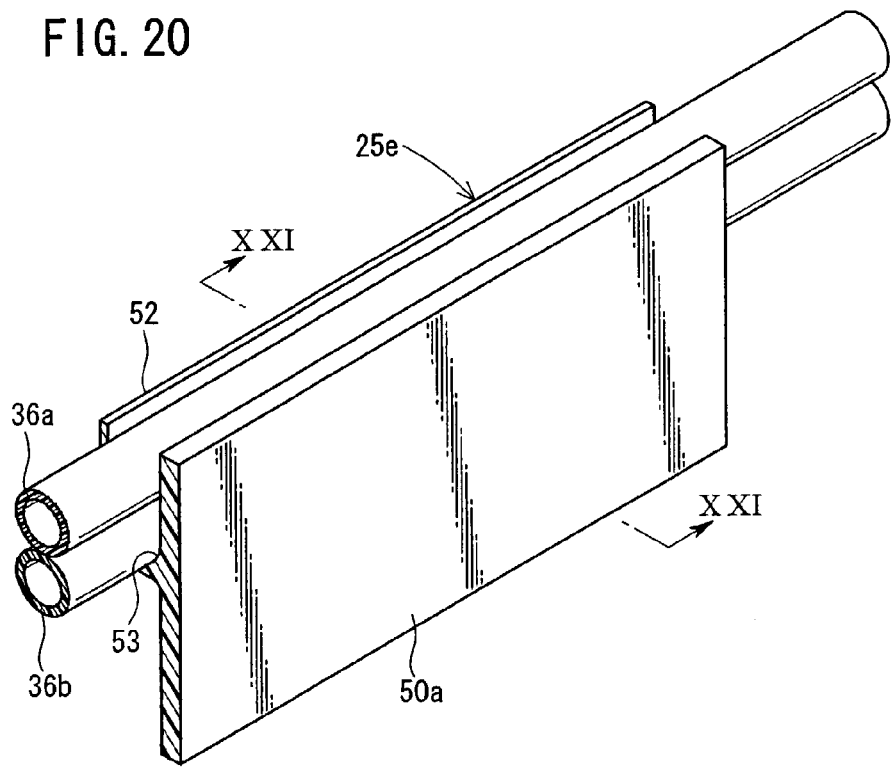
FIG. 20 is, with partial cross section, a perspective view illustrating a belt member according to a fourth modified embodiment.
Figure 21:
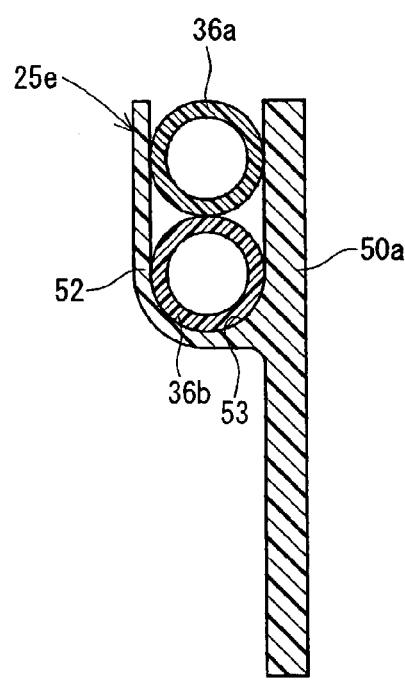
FIG. 21 is a vertical sectional view taken along a line XXI—XXI shown in FIG. 20.

As shown in FIGS. 20 and 21, an accommodating section 52, which holds a plurality of tubes 36a, 36b protruding by predetermined lengths from the side surface of a thin plate-shaped plate member 50a of, for example, a resin material, is formed for the belt member 25e according to the fourth embodiment. The accommodating section 52 has a long groove 53 for accommodating the plurality of tube 36a, 36b in parallel in the height direction from the upper portion. The depth of the long groove 53 is set to be a depth corresponding to the number of the tubes 36a, 36b to be accommodated. The number of the tubes 36a, 36b is not specifically limited. The number may be either single or plural.

When the structure as described above is adopted, the rigidity of the belt member 25e in the height direction is secured by the portion of the thin plate member 50a. Accordingly, even when the number of the tubes 36a, 36b is small, it is possible to secure the large rigidity of the belt member 25e in the height direction. It is possible to suppress the bending in the direction of the gravity generated in the belt member 25e.

It is easy to perform the maintenance operation because the tubes 36a, 36b are exposed.

Figure 22:
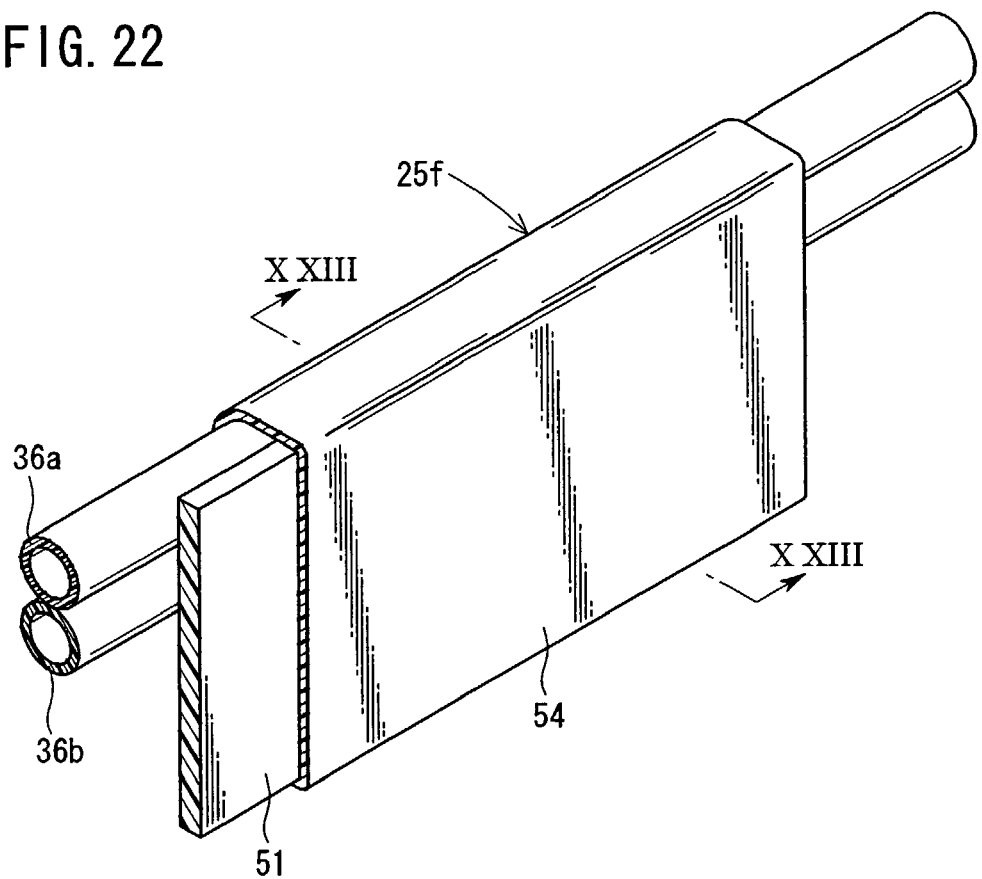
FIG. 22 is, with partial cross section, a perspective view illustrating a belt member according to a fifth modified embodiment.
Figure 23:
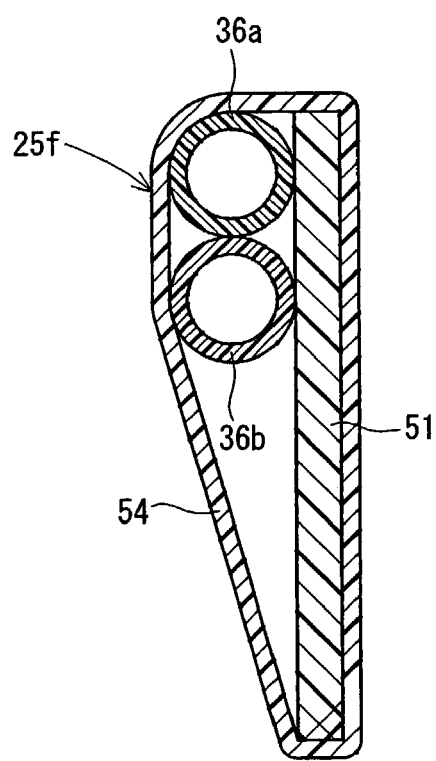
FIG. 23 is a vertical sectional view taken along a line XXIII—XXIII shown in FIG. 22.

As shown in FIGS. 22 and 23, in the belt member 25f according to the fifth embodiment, a plurality of tubes 36a, 36b are arranged in parallel on the upper portions of the side surface of a thin plate-shaped reinforcing plate 51 of, for example, a resin material. The reinforcing plate 51 and the plurality of tubes 36a, 36b are covered with a cover member 54. The number of the tubes 36a, 36b is not specifically limited. The number may be either single or plural.

When the structure as described above is adopted, the rigidity of the belt member 25f in the height direction is secured by the portion of the thin reinforcing plate 51. Accordingly, it is possible to suppress the bending in the direction of the gravity generated in the belt member 25f. The belt member 25f is also excellent, for example, in waterproofness and chemical resistance, because the tubes 36a, 36b are not exposed.

Figure 24:
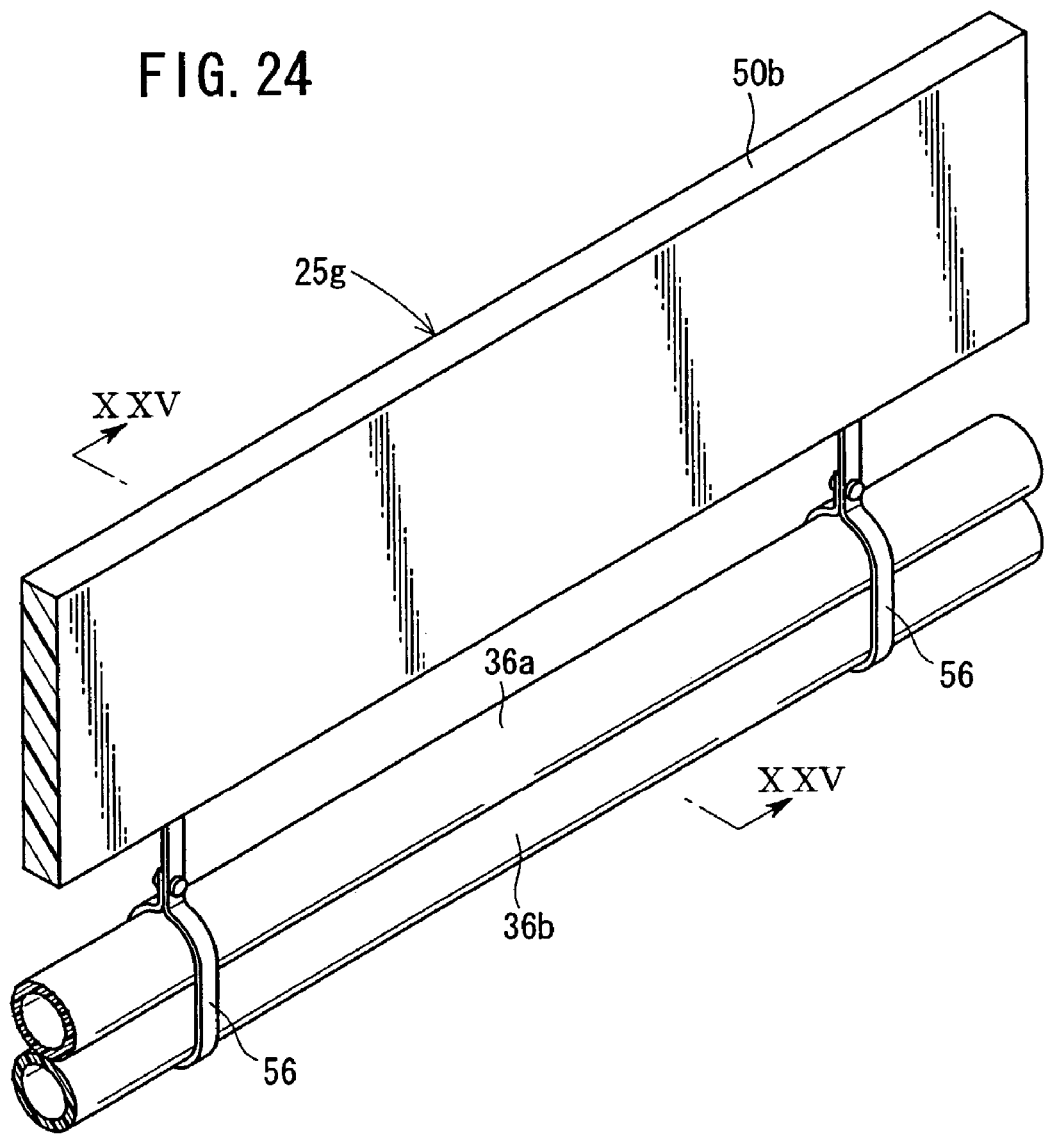
FIG. 24 is, with partial cross section, a perspective view illustrating a belt member according to a sixth modified embodiment.
Figure 25:
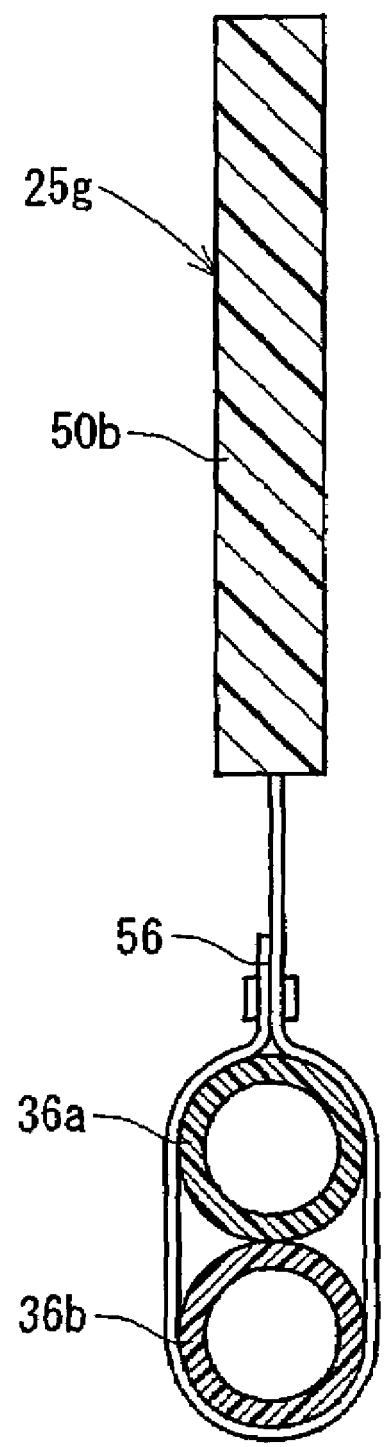
FIG. 25 is a vertical sectional view taken along a line XXV—XXV shown in FIG. 24.
Figure 26:
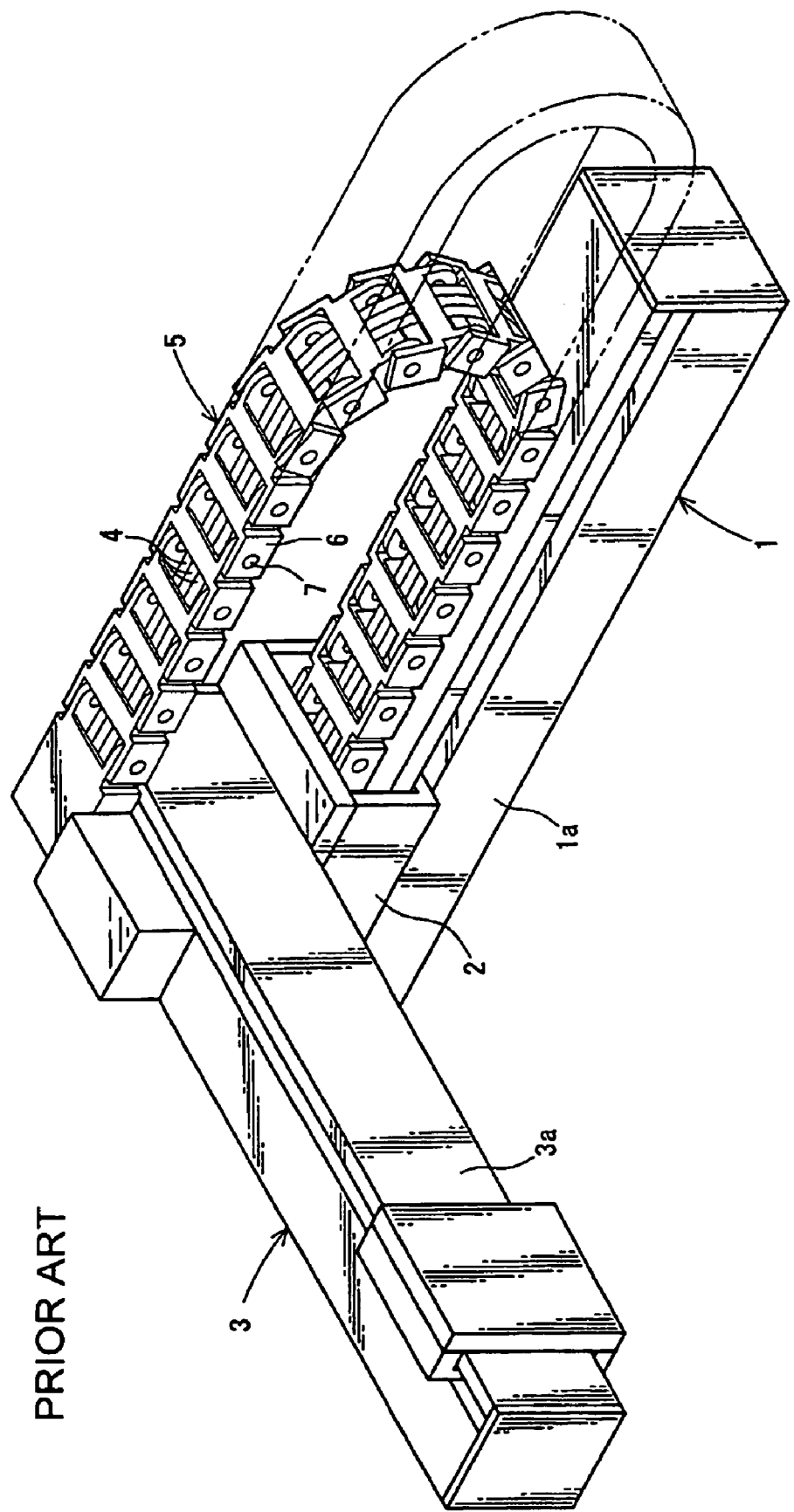
FIG. 26 is a perspective view illustrating an actuator with conventional cables.

As shown in FIGS. 24 and 25, in the belt member 25g according to the sixth modified embodiment, hanging members 56, each of which comprises a wire or the like, are provided on the lower surface of a thin plate member 50b of, for example, a resin material. A plurality of tubes 36a, 36b, which are integrally connected by means of welding or the like, are hung under the plate member 50b by means of the hanging members 56. The hanging members 56 connects the plate member 50b with the tubes 36a, 36b while the hanging members 56 are spaced from each other by predetermined distances.

When the structure as described above is adopted, the rigidity of the belt member 25g in the height direction is secured by the thin plate member 50b. Therefore, it is possible to suppress the bending in the direction of the gravity generated in the belt member 25g. It is easy to perform maintenance operation because the tubes 36a, 36b are exposed.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A cable structure comprising:
a fixed end fixed to an actuator body;
a movable end attached to a displaceable member which is displaced in an axial direction of said actuator body; and
a belt member provided between said fixed end and said movable end,
wherein said belt member is flexible on a horizontal plane when said displaceable member is displaced together with said movable end,
wherein a longer side surface of said belt member is parallel to a vertical plane, and
wherein a dimension of said longer side surface of said belt member which is parallel to said vertical plane is larger than a dimension of a shorter side surface of said belt member which is perpendicular to said vertical plane.

2. The cable structure according to claim 1, wherein said belt member has attachment sections to be connected to said fixed end and said movable end respectively, and each of said attachment sections is provided with a mechanism for suppressing bending at an intermediate portion of said belt member caused by own weight of said belt member.

3. The cable structure according to claim 1, wherein said actuator body is provided with a guide mechanism for suppressing bending at an intermediate portion of said belt member caused by own weight of said belt member.

4. The cable structure according to claim 3, wherein said guide mechanism comprises a guide member which has a plane flush with a lower surface of said fixed end.

5. The cable structure according to claim 1, wherein said belt member is provided with a member for hanging an intermediate portion of said belt member between said fixed end and said movable end.

6. The cable structure according to claim 1, wherein said belt member comprises a tube which is provided in an axial direction of said belt member and which has a passage formed therein.

7. The cable structure according to claim 1, wherein said belt member has a tube which has a passage formed therein, and plate-shaped wall surfaces which are formed to extend in directions perpendicular to said axis of said belt member from said tube respectively.

8. The cable structure according to claim 1, wherein said belt member is provided with a pair of tubes which are spaced from each other in a direction perpendicular to said axis of said belt member, and a plate-shaped wall which connects each of said pair of tubes.

9. The cable structure according to claim 1, wherein said belt member is provided with a plurality of tubes each of which has a passage formed therein, and a holding member which holds said plurality of tubes while being spaced from each other by a certain distance in a direction perpendicular to said axis of said belt member.

10. The cable structure according to claim 1, wherein said belt member comprises a plate member, tubes which are provided along a side of said plate member and each of which has a passage formed therein, and a section in which said tubes are accommodated.

11. The cable structure according to claim 1, wherein said belt member is provided with a plate, tubes which are arranged on a side of said plate and each of which has a passage formed therein, and a cover member which covers said plate and said tubes.

12. The cable structure according to claim 1, wherein said belt member comprises a plate member and tubes which are hung from an end of said plate member by hanging members and each of which has a passage formed therein.

* * * * *